United States Patent
Geppert et al.

(10) Patent No.: US 9,605,541 B2
(45) Date of Patent: Mar. 28, 2017

(54) BLADED ROTOR FOR A TURBOMACHINE

(71) Applicant: MTU Aero Engines AG, Munich (DE)

(72) Inventors: Johann Geppert, Tuerkenfeld (DE); Peter Eibelshaeuser, Munich (DE)

(73) Assignee: MTU Aero Engines AG, Munich (DE)

( * ) Notice: Subject to any disclaimer, the term of this patent is extended or adjusted under 35 U.S.C. 154(b) by 818 days.

(21) Appl. No.: 13/951,051

(22) Filed: Jul. 25, 2013

(65) Prior Publication Data

US 2014/0044546 A1 Feb. 13, 2014

(30) Foreign Application Priority Data

Aug. 9, 2012 (EP) ..................................... 12179759

(51) Int. Cl.
*F01D 5/02* (2006.01)
*F01D 5/10* (2006.01)
*F04D 29/66* (2006.01)
*F04D 29/32* (2006.01)

(52) U.S. Cl.
CPC ................. *F01D 5/02* (2013.01); *F01D 5/10* (2013.01); *F04D 29/321* (2013.01); *F04D 29/666* (2013.01); *F05D 2260/961* (2013.01); *Y02T 50/671* (2013.01)

(58) Field of Classification Search
CPC ..... F01D 5/02; F01D 5/10; F01D 5/16; F01D 5/26; F04D 29/321; F04D 29/666; F05D 2260/961; F05D 2260/96
See application file for complete search history.

(56) References Cited

U.S. PATENT DOCUMENTS

| | | | | |
|---|---|---|---|---|
| 3,006,603 | A | * | 10/1961 | Caruso .................... F01D 5/043 415/1 |
| 4,253,800 | A | * | 3/1981 | Segawa .................... F01D 5/10 415/119 |
| 5,026,251 | A | | 6/1991 | Kinoshita et al. |
| 5,163,810 | A | | 11/1992 | Smith et al. |
| 5,306,119 | A | | 4/1994 | Bandoh et al. |
| 5,342,167 | A | | 8/1994 | Rosseau et al. |
| 5,540,551 | A | * | 7/1996 | Heinig ..................... F01D 5/22 416/190 |
| 6,379,112 | B1 | * | 4/2002 | Montgomery ............ F01D 5/10 415/119 |

(Continued)

FOREIGN PATENT DOCUMENTS

| | | |
|---|---|---|
| DE | 2524555 | 12/1975 |
| DE | 4421604 | 4/1995 |

(Continued)

*Primary Examiner* — Craig Kim
*Assistant Examiner* — Eldon Brockman
(74) *Attorney, Agent, or Firm* — Davidson, Davidson & Kappel, LLC

(57) ABSTRACT

A bladed rotor for a turbomachine, in particular a gas turbine, having a plurality of blades distributed around the circumference thereof; the blade distribution being made up of a natural-number sector count of first angular sectors and second angular sectors; a first blade count of first blades being arranged in the first angular sectors, and a second blade count of second blades being arranged in the second angular sectors, said second blade count being different from said first blade count; and the sector count being odd ($Z=2n+1$, $n=1, 2, 3, \ldots$) and/or greater than two ($Z>2$).

18 Claims, 1 Drawing Sheet

(56) References Cited

U.S. PATENT DOCUMENTS

| | | | | |
|---|---|---|---|---|
| 7,029,227 B2* | 4/2006 | Berthillier | ............... | F01D 5/10 415/1 |
| 7,097,420 B2* | 8/2006 | Cormier | ............... | F01D 9/041 29/889.22 |
| 7,367,775 B2* | 5/2008 | Borufka | ............... | F01D 5/027 415/119 |
| 7,383,136 B1* | 6/2008 | Griffin | ............... | G01H 1/006 702/56 |
| 7,651,316 B2* | 1/2010 | Kruger | ............... | F04D 29/544 415/119 |
| 8,172,511 B2* | 5/2012 | Duong | ............... | F04D 29/284 415/119 |
| 8,534,991 B2* | 9/2013 | Topol | ............... | F01D 5/16 415/119 |
| 8,678,752 B2* | 3/2014 | Delvaux | ............... | F01D 5/142 415/119 |
| 8,684,685 B2* | 4/2014 | Delvaux | ............... | F01D 5/3007 415/194 |
| 2005/0175483 A1* | 8/2005 | Kruger | ............... | F04D 29/544 417/423.1 |
| 2006/0275127 A1* | 12/2006 | Borufka | ............... | F01D 5/027 416/203 |
| 2010/0278633 A1* | 11/2010 | Duong | ............... | F04D 29/284 415/119 |
| 2012/0099961 A1* | 4/2012 | Delvaux | ............... | F01D 5/142 415/62 |
| 2012/0099995 A1* | 4/2012 | Delvaux | ............... | F01D 5/30 416/203 |
| 2012/0099996 A1* | 4/2012 | Delvaux | ............... | F01D 5/3007 416/204 A |

FOREIGN PATENT DOCUMENTS

| | | |
|---|---|---|
| EP | 0785362 A1 | 7/1997 |
| EP | 1 580 400 A1 | 9/2005 |
| GB | 1293553 | 10/1972 |
| WO | WO2004111393 | 12/2004 |

* cited by examiner

Z = 3,
N_A = 10,
N_B = 9

Z = 2,
N_A = 15,
N_B = 14

Z = 4,
N_A = 8,
N_B = 7

BLADED ROTOR FOR A TURBOMACHINE

This claims the benefit of European Patent Application EP 12179759.1, filed Aug. 9, 2012 and hereby incorporated by reference herein.

The present invention relates to a bladed rotor for a turbomachine, in particular a gas turbine, in particular an aircraft engine, having one or more such rotors, and to a method for blading such a rotor.

BACKGROUND

Rotors whose blades are distributed equidistantly around the entire circumference thereof may exhibit disadvantageous wake and dynamic pressure distributions.

EP 1 580 400 A1 describes an aircraft gas turbine rotor having a blade distribution in four quadrants, where the blade count of one quadrant differs from the blade count of the two adjacent quadrants.

SUMMARY OF THE INVENTION

It is an object of the present invention to provide an improved turbomachine.

The present invention provides a rotor for a turbomachine, in particular a gas turbine, preferably an aircraft engine, has at least one stage having a plurality of blades which are distributed around the circumference thereof according to or in a blade distribution. The term "blade distribution", as used herein, is understood to mean, in particular, an array or pattern which describes or defines the distribution of the blades around or along the circumference, in particular the angular spacing of the blades, in particular of their inlet and/or outlet edges, in particular at the roots, centers and/or tips of the blades.

The blade distribution is made up of a sector count Z of first angular sectors and second angular sectors, a first blade count $N_A$ of first blades being arranged in each of the first angular sectors, and a second blade count $N_B$ of second blades being arranged in each of the second angular sectors disposed between two respective first angular sectors, said second blade count being different from said first blade count. The angular sectors each extend over an angular range, preferably an equal angular range, which is obtained, in particular, by dividing 360° by the twice the sector count (360°/(2Z)). In this connection, each of the first angular sectors adjoins a second angular sector on both sides and vice versa.

In a first aspect of the present invention, the natural-number sector count Z is odd and greater than one (Z=2n+1, n=1, 2, 3, 4, . . . ). In particular, sector count Z may be three, so that the first and second angular sectors each have or are 60°.

In particular, if in one embodiment, the first and second blade counts differ by an odd integral number Δ (Δ=2n+1, n=±1, ±2, ±3, ±4, . . . ), in particular by one (Δ=1) then altogether an odd blade count is obtained on the rotor:

$$Z \cdot N_A + Z \cdot N_B = Z \cdot (N_A + N_B) = Z \cdot (N_A + N_A + \Delta) = \underbrace{2 \cdot Z \cdot N_A}_{even} + \underbrace{Z \cdot \Delta}_{odd}$$

Additionally or alternatively, in a second aspect of the present invention, the natural-number sector count Z is greater than two (Z=3, 4, 5, 6). In particular, sector count Z may be four, so that the first and second angular sectors each have or are 45°.

The first blades in the first angular sectors and the second blades in the second angular sectors may be at least substantially identical and, in particular, may each have substantially the same mass. Compared to the blade distribution in four quadrants, the odd and/or greater sector count allows for a better distribution of the blade mass around the circumference, which eliminates the need for mass balancing using more lighter blades and less heavier blades. The use of identical blades advantageously facilitates warehousing and assembly. It is also possible in one embodiment that the blades of the angular sectors with the greater blade count have a smaller or larger mass than the blades of the angular sectors with the smaller blade count. For example, if the first blade count is greater, in particular, one greater than the second blade count ($N_A=N_B+\Delta$ or $N_A=N_B+1$), then the mass $m_A$ of a first blade may be equal to the product of the mass $m_A$ of a second blade and the quotient of the first and second blade counts:

$$m_A = m_B \cdot \left(\frac{N_B}{N_A}\right)$$

The first blades in the first angular sectors and/or the second blades in the second angular sectors may be distributed at least substantially equidistantly from each other. Additionally or alternatively, a distance $u_{12}$ between a first blade circumferentially adjacent to a second angular sector and a second blade circumferentially adjacent to this first blade may be at least substantially equal to half the sum of the distance $u_{11}$ between this first blade and a first blade circumferentially adjacent thereto and the distance $u_{22}$ between this second blade and a second blade circumferentially adjacent thereto:

$$u_{12}=(u_{11}+u_{22})/2.$$

In this way, the transition between adjacent angular sectors is optimized.

In one embodiment, the first and/or second blades may be formed integrally with a hub.

BRIEF DESCRIPTION OF THE DRAWINGS

Further advantages and features will become apparent from the dependent claims and the exemplary embodiments. To this end, the drawings show, partly in schematic form, in:

DETAILED DESCRIPTION

Figure 1:
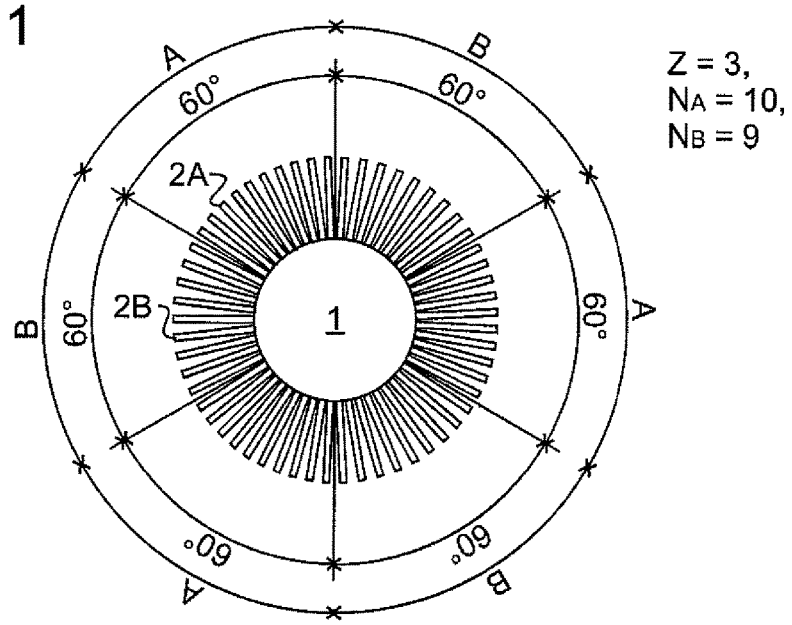
FIG. 1, an axial elevation view of a bladed rotor of an aircraft engine gas turbine according to an embodiment of the present invention; and in FIGS. 2A-D, A/F ratios of a rotor whose blades are distributed equidistantly around the entire circumference thereof (FIG. 2A), of a rotor having four angular sectors (FIG. 2B), of the rotor according to FIG. 1 (FIG. 2C), and of a rotor according to another embodiment of the present invention with eight angular sectors (FIG. 2D).

FIG. 1 shows, in an axial elevation view, a bladed rotor 10 of an aircraft engine gas turbine 100 according to an embodiment of the present invention.

The rotor 10 has a hub 1 and blades 2A, 2B which are distributed around the circumference thereof and are, in particular, formed integrally with hub 1.

The blade distribution is made up of three first angular sectors A and three second angular sectors B, and thus has a sector count Z=3. Accordingly, the angular sectors each have 60°.

In each of the first angular sectors A, ten first blades 2A are distributed equidistantly from each other. Thus, first angular sectors A have a blade count $N_A=10$.

In each of the second angular sectors B disposed between two respective first angular sectors A, nine second blades 2B are distributed equidistantly from each other. Thus, second angular sectors B have a blade count $N_B=9$.

First blades 2A in first angular sectors A and second blades 2B in second angular sectors B are identical, in particular in terms of their masses. The distance between the sector-outer first blades adjacent to the adjacent second angular sector and the sector-outer second blades adjacent to respective ones of these first blades is equal to half the sum of the distance between these sector-outer first blades and their adjacent sector-second-outermost first blades and the distance between these sector-outer second blades and their adjacent sector-second-outermost second blades.

Figure 2A:
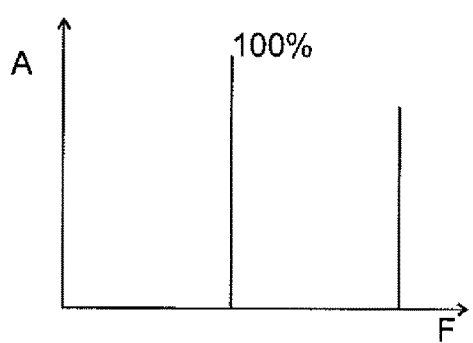

FIG. 2A shows, as a reference, an A(mplitude)/F(requency) ratio for a rotor having 58 blades distributed equidistantly around the entire circumference thereof, where the maximum value is normalized or scaled as 100%.

Figure 2B:
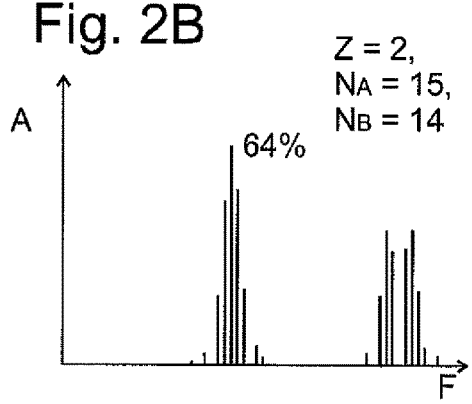
Figure 2C:
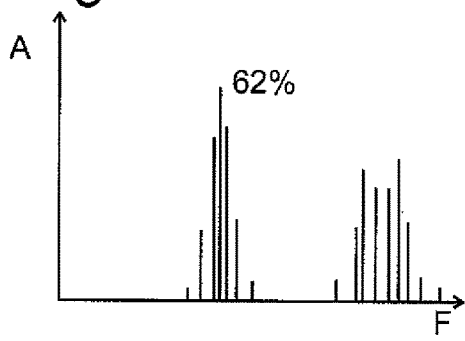
Figure 2D:
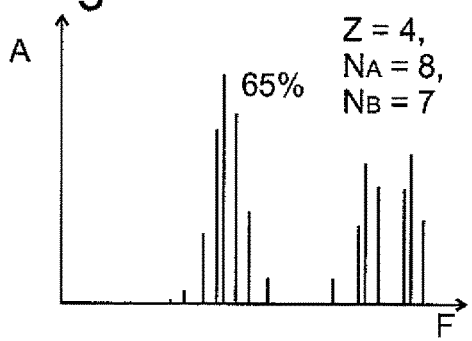

In comparison, FIG. 2B shows the A/F ratio of a rotor having four angular sectors with 14 or 15 blades each, which also makes a total of 58 blades. FIG. 2C illustrates the A/F ratio for the aforedescribed inventive rotor of FIG. 1 with 3×10+3×9=57 blades. FIG. 2D shows the A/F ratio for a rotor according to another embodiment of the present invention, which has eight angular sectors; i.e., a sector count of four (Z=4), and whose angular sectors each have 45°, and where eight first blades are equidistantly distributed in each of the first angular sectors, which thus have a first blade count $N_A=8$, and where seven second blades identical to the first blades are equidistantly distributed in each of the second angular sectors disposed between two respective first angular sectors, which second angular sectors thus have a second blade count $N_B=7$, making a total of 60 blades.

It can be seen that the maximum value for a rotor having four angular sectors (FIG. 2B) is reduced to 64% of the reference value for a rotor whose blades are distributed equidistantly around the entire circumference thereof (FIG. 2A).

In contrast, a blade distribution according to FIG. 1 enables a further reduction to 62% (FIG. 2C).

In contrast, in the case of a blade distribution having a sector count of four, the maximum value increases again to 65% (FIG. 2D), but is also significantly reduced compared to the reference of a rotor whose blades are distributed equidistantly around the entire circumference thereof (FIG. 2A). However, due to the greater sector count, the first and second blades can advantageously be identical for a sector count of four, without causing major imbalances, as may be the case for a sector count of two; i.e., in the case of four quadrants (FIG. 2B).

What is claimed is:

1. A bladed rotor for a turbomachine, comprising a plurality of blades distributed around a circumference of the bladed rotor; wherein a blade distribution of the plurality of blades is a natural-number sector count (Z) of first angular sectors and second angular sectors; a first blade count of first blades being arranged in the first angular sectors, and a second blade count of second blades being arranged in the second angular sectors, said second blade count being different from said first blade count, each of the first and second angular sectors extending around an angle equal to 360 degrees divided by 2Z and where each first angular sector adjoining on both sides with the second angular sectors, and each second angular sector adjoining on both sides with the first angular sectors;

wherein the natural number sector count is odd (Z=2n+1, n=1, 2, 3, . . . ) and/or greater than two (Z>2).

2. The rotor as recited in claim 1, wherein the first blades in the first angular sectors and the second blades in the second angular sectors are at least substantially identical.

3. The rotor as recited in claim 1, wherein the first blades in the first angular sectors and/or the second blades in the second angular sectors are distributed at least substantially equidistantly from each other.

4. The rotor as recited in claim 2, wherein the first blades in the first angular sectors and/or the second blades in the second angular sectors are distributed at least substantially equidistantly from each other.

5. The rotor as recited in claim 1, wherein a distance between a first blade adjacent to a second angular sector and a second blade adjacent to this first blade is at least substantially equal to half the sum of the distance between this first blade and a first blade adjacent thereto and the distance between this second blade and a second blade adjacent thereto.

6. The rotor as recited in claim 2, wherein a distance between a first blade adjacent to a second angular sector and a second blade adjacent to this first blade is at least substantially equal to half the sum of the distance between this first blade and a first blade adjacent thereto and the distance between this second blade and a second blade adjacent thereto.

7. The rotor as recited in claim 1, wherein the first and second blade counts differ by an odd integral number.

8. The rotor as recited in claim 7, wherein the odd integral number is one.

9. The rotor as recited in claim 1, wherein the sector count is three (Z=3), and the angular sectors each have 60°.

10. The rotor as recited in claim 2, wherein the sector count is three (Z=3), and the angular sectors each have 60°.

11. The rotor as recited in claim 4, wherein the sector count is three (Z=3), and the angular sectors each have 60°.

12. The rotor as recited in claim 5, wherein the sector count is three (Z=3), and the angular sectors each have 60°.

13. The rotor as recited in claim 1, wherein the sector count is four (Z=4), and the angular sectors each have 45°.

14. The rotor as recited in claim 2, wherein the sector count is four (Z=4), and the angular sectors each have 45°.

15. The rotor as recited in claim 4, wherein the sector count is four (Z=4), and the angular sectors each have 45°.

16. The rotor as recited in claim 5, wherein the sector count is four (Z=4), and the angular sectors each have 45°.

17. The rotor as recited in claim 1, wherein the blades are formed integrally with a hub.

18. A aircraft engine gas turbine, comprising at least one rotor according to claim 1.

* * * * *